US012703583B2

(12) United States Patent
Tokairin

(10) Patent No.: US 12,703,583 B2
(45) Date of Patent: Aug. 11, 2026

(54) SUBSTRATE PROCESSING SYSTEM, ALIGNING APPARATUS, AND SUBSTRATE SHAPE MONITORING METHOD INCLUDING SPEED AND/OR ACCELERATION DECREASING PROTOCOL

(71) Applicant: Tokyo Electron Limited, Tokyo (JP)

(72) Inventor: Kento Tokairin, Miyagi (JP)

(73) Assignee: Tokyo Electron Limited, Tokyo (JP)

( * ) Notice: Subject to any disclaimer, the term of this patent is extended or adjusted under 35 U.S.C. 154(b) by 522 days.

(21) Appl. No.: 18/185,695

(22) Filed: Mar. 17, 2023

(65) Prior Publication Data

US 2023/0294932 A1 Sep. 21, 2023

(30) Foreign Application Priority Data

Mar. 18, 2022 (JP) ................................ 2022-044374

(51) Int. Cl.
*B65G 47/90* (2006.01)

(52) U.S. Cl.
CPC ................................ *B65G 47/905* (2013.01)

(58) Field of Classification Search
CPC ............ B65G 47/905; H01L 21/67196; H01L 21/67742; H01L 21/681; H01L 21/67259; H01L 21/67253; H01L 21/68714
See application file for complete search history.

(56) References Cited

U.S. PATENT DOCUMENTS

2006/0222236 A1* 10/2006 Osada .................. H01L 21/681 382/151

FOREIGN PATENT DOCUMENTS

| | | |
|---|---|---|
| JP | 2004-047654 | 2/2004 |
| JP | 2014-060373 | 4/2014 |
| JP | 2014060373 A * | 4/2014 |

* cited by examiner

*Primary Examiner* — Norman D Richards
*Assistant Examiner* — Ethan Edward Cutler
(74) *Attorney, Agent, or Firm* — IPUSA, PLLC

(57) ABSTRACT

A substrate processing system includes a stage on which a substrate is to be placed, a rotation mechanism unit configured to rotate the stage, a sensor configured to detect an outline position of the substrate while the substrate is rotated, and a control device. The control device performs control of:

(a) rotating the stage at a first speed and a first acceleration when the substrate is initially rotated;

(b) with reference to information on the outline position detected by the sensor when the stage is rotated by one full rotation, determining whether a misalignment amount of the outline position is a threshold value or greater; and (c) rotating the stage at a second speed lower than the first speed, a second acceleration lower than the first acceleration, or both, and performing a retry operation of (b) in response to determining that the misalignment amount is the threshold value or greater.

12 Claims, 11 Drawing Sheets

: NON-SLIPPING WAFER
: SLIPPING WAFER
Δr
Re
Re
SLIP AT INTERMEDIATE STAGE OF ROTATION
SLIP AT INITIAL STAGE OF ROTATION
Rc
Rs
POSITION OF OUTLINE OF WAFER
ROTATION START POINT
POSITION OF WAFER IN ROTATION DIRECTION
ROTATION END POINT

FIG. 6

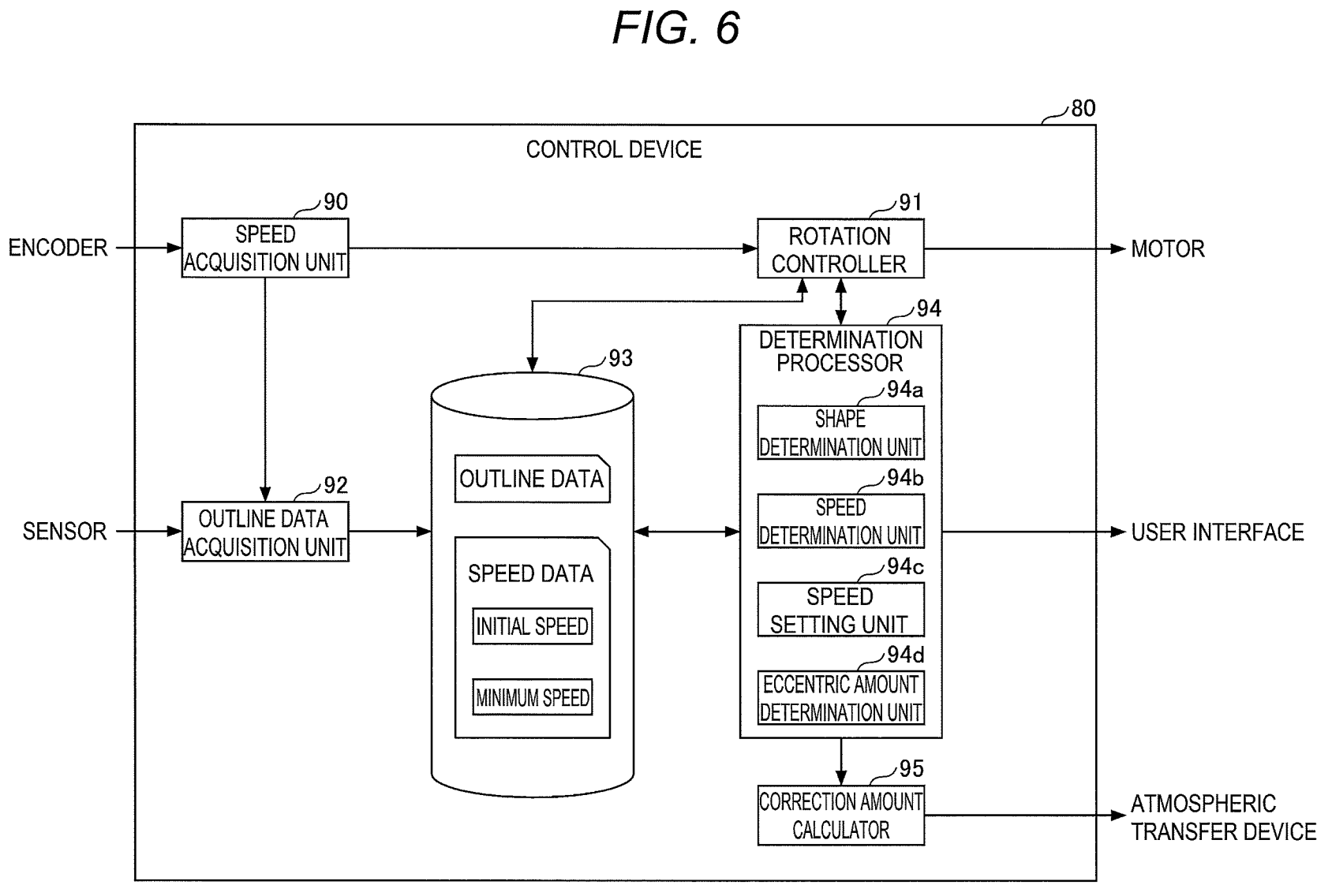

80 CONTROL DEVICE

ENCODER

SENSOR

90 SPEED ACQUISITION UNIT

92 OUTLINE DATA ACQUISITION UNIT

93

OUTLINE DATA

SPEED DATA

INITIAL SPEED

MINIMUM SPEED

91 ROTATION CONTROLLER

94 DETERMINATION PROCESSOR

94a SHAPE DETERMINATION UNIT

94b SPEED DETERMINATION UNIT

94c SPEED SETTING UNIT

94d ECCENTRIC AMOUNT DETERMINATION UNIT

95 CORRECTION AMOUNT CALCULATOR

MOTOR

USER INTERFACE

ATMOSPHERIC TRANSFER DEVICE

SPEED
TIME
MIS-ALIGNMENT OCCURS
SPEED
TIME

SPEED
TIME
MIS-ALIGNMENT OCCURS
SPEED
TIME
MIS-ALIGNMENT OCCURS
SPEED
TIME
96
USER SETTING UNIT
SPEED
TIME

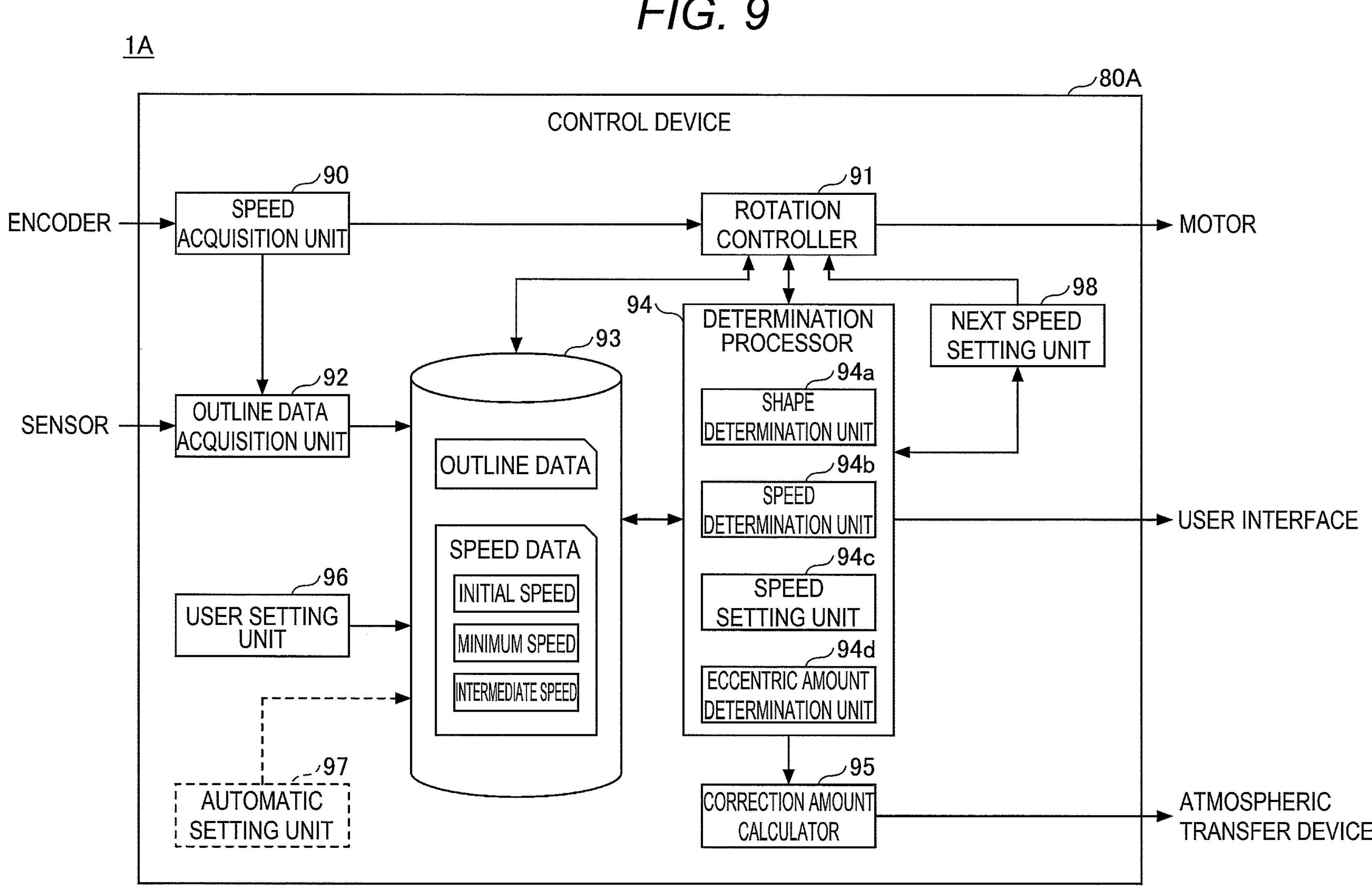
FIG. 9
1A
80A
CONTROL DEVICE
ENCODER
SENSOR
90
SPEED ACQUISITION UNIT
91
ROTATION CONTROLLER
MOTOR
92
OUTLINE DATA ACQUISITION UNIT
93
OUTLINE DATA
SPEED DATA
INITIAL SPEED
MINIMUM SPEED
INTERMEDIATE SPEED
94
DETERMINATION PROCESSOR
94a
SHAPE DETERMINATION UNIT
94b
SPEED DETERMINATION UNIT
94c
SPEED SETTING UNIT
94d
ECCENTRIC AMOUNT DETERMINATION UNIT
98
NEXT SPEED SETTING UNIT
USER INTERFACE
96
USER SETTING UNIT
97
AUTOMATIC SETTING UNIT
95
CORRECTION AMOUNT CALCULATOR
ATMOSPHERIC TRANSFER DEVICE SPEED DETERMINATION PROCESSING SUBROUTINE
S171
ROTATION SPEED OF WAFER IS INITIAL SPEED?
NO
YES
S176
ROTATION SPEED OF WAFER IS INTERMEDIATE SPEED?
NO
YES
S172
ANY INTERMEDIATE SPEED IS SET?
NO
YES
S173
CHANGE TO INTERMEDIATE SPEED
S175
CHANGE TO MINIMUM SPEED
S177
NOTIFY ERROR
S174
RETURN TO STEP S11
SPEED DETERMINATION PROCESSING SUBROUTINE

SUBSTRATE PROCESSING SYSTEM, ALIGNING APPARATUS, AND SUBSTRATE SHAPE MONITORING METHOD INCLUDING SPEED AND/OR ACCELERATION DECREASING PROTOCOL

CROSS-REFERENCE TO RELATED APPLICATIONS

This application is based on and claims priority to Japanese Patent Application No. 2022-044374, filed on Mar. 18, 2022, the entire contents of which are incorporated herein by reference.

TECHNICAL FIELD

The present disclosure relates to a substrate processing system, an aligning apparatus, and a substrate shape monitoring method.

BACKGROUND

Patent Document 1 discloses a substrate aligning apparatus that detects an outline position of a substrate (a wafer) placed on a stage while rotating the wafer, thereby calculating an eccentric amount and an eccentric direction of the wafer with respect to the stage. The wafer placed on the stage may slip from the stage due to a centrifugal force or the like during rotation of the stage. When the wafer slips, a rotation start point and a rotation end point do not coincide with each other in detection of the outline position of the wafer, and the aligning apparatus erroneously detects the slip of the wafer as a chipped wafer (error).

RELATED ART DOCUMENTS

Patent Documents

Patent Document 1: Japanese Laid-open Patent Application Publication No. 2004-47654

SUMMARY

According to an aspect of the present disclosure, with respect to a substrate processing system for processing a substrate, the substrate processing system includes a stage on which the substrate is to be placed, a rotation mechanism unit configured to rotate the stage, a sensor configured to detect an outline position of the substrate while the substrate is rotated, and a control device. The control device performs control of:

(a) rotating the stage at a first speed and a first acceleration when the substrate is initially rotated;

(b) with reference to information on the outline position of the substrate detected by the sensor when the stage is rotated by one full rotation from a rotation start point to a rotation end point, determining whether a misalignment amount of the outline position of the substrate between the rotation start point and the rotation end point is greater than or equal to a threshold value; and (c) rotating the stage at a second speed lower than the first speed, a second acceleration lower than the first acceleration, or both, and performing a retry operation of the determination of (b), in response to determining that the misalignment amount of the outline position of the substrate is greater than or equal to the threshold value.

BRIEF DESCRIPTION OF DRAWINGS

FIG. 6 is a block diagram illustrating functional blocks of a control device according to a first embodiment;

FIG. 9 is a block diagram illustrating functional blocks of a control device of a substrate processing system according to a second embodiment;

DETAILED DESCRIPTION

Figure 1:
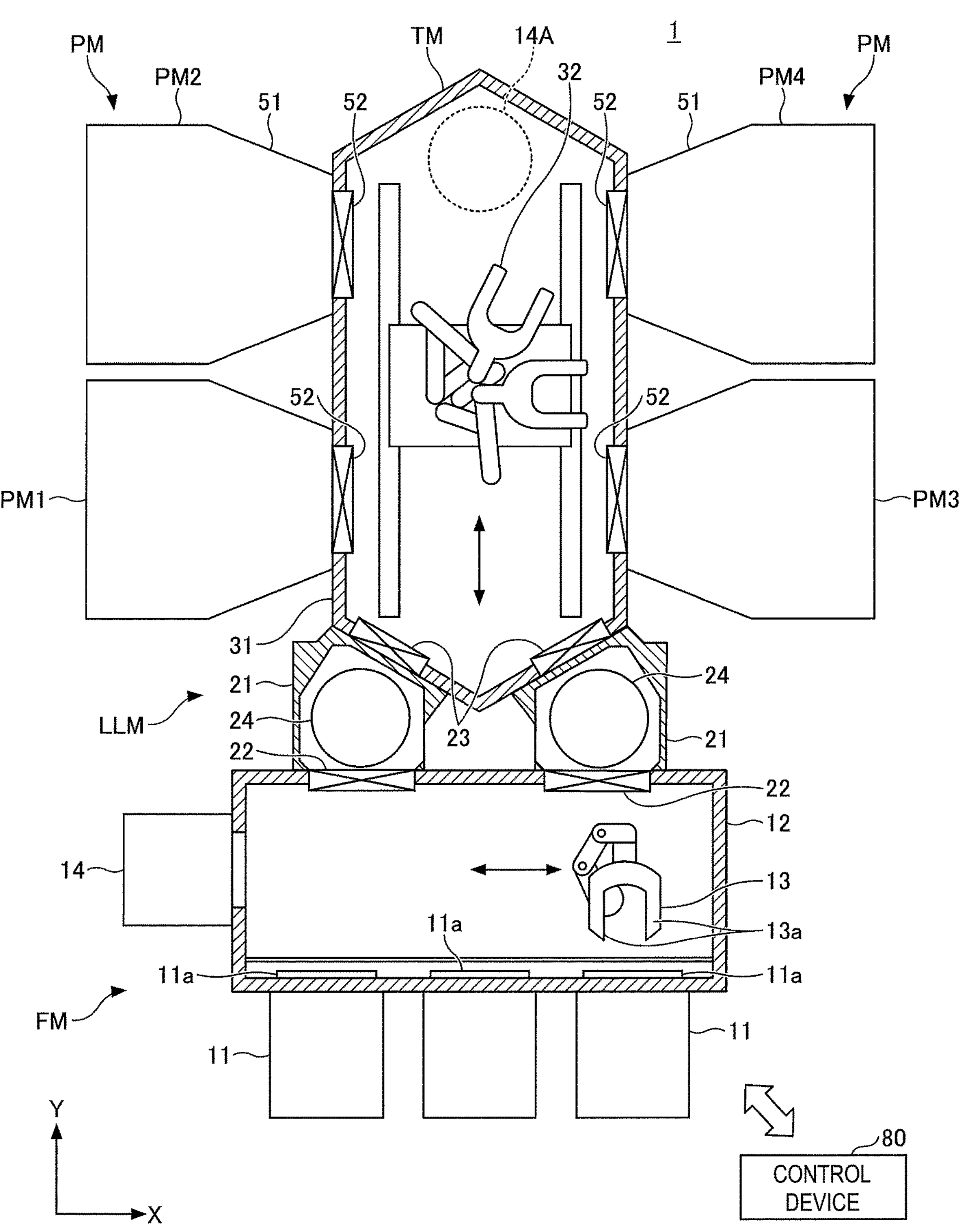
FIG. 1 is a plan view schematically illustrating an overall configuration of a substrate processing system according to an embodiment.

Hereinafter, embodiments of the present disclosure will be described with reference to the drawings. In the respective drawings, the same components will be denoted by the same reference numerals, and overlapping descriptions thereof may be appropriately omitted.

Common Embodiment

FIG. 1 is a plan view schematically illustrating an overall configuration of a substrate processing system 1 according to an embodiment. As illustrated in FIG. 1, the substrate processing system 1 is implemented as a multi-chamber type including a plurality of process modules PM. The substrate processing system 1 is used in a process of manufacturing a semiconductor, and transfers a substrate from a front module FM to a predetermined process module PM through a transfer module TM to perform appropriate substrate processing in the process module PM.

An example of the substrate on which the substrate processing is performed includes a silicon semiconductor wafer, a compound semiconductor wafer, an oxide semiconductor wafer, or the like (hereinafter, the substrate is also referred to as a wafer W). The wafer W is formed into a circular plate having a perfect circular shape in a plan view. The wafer W may have a recess pattern such as a trench or a via.

In order to perform the substrate processing of the wafer W in a vacuum atmosphere, the substrate processing system 1 loads the wafer W from an ambient air atmosphere into the vacuum atmosphere, and unloads the wafer W from the vacuum atmosphere into the ambient air atmosphere. Specifically, the substrate processing system 1 includes the front module FM (e.g., an equipment front end module (EFEM)) and a load-lock module LLM. The substrate processing system 1 also includes a control device 80 for controlling an operation of an entire system.

The front module FM includes a plurality of load ports 11, a continuous loader 12 adjacent to the load ports 11, an atmospheric transfer device 13 provided in the loader 12, and an aligning apparatus (an orienter) 14 provided at a position adjacent to the loader 12.

A front opening unified pod (FOUP) accommodating the wafer W or an empty FOUP is set in each load port 11. The loader 12 has a rectangular box body having a clean space therein. The loader 12 includes an air flow mechanism (not illustrated) that supplies clean air to the clean space. The load ports 11 are arranged side by side in a longitudinal direction of the loader 12. A gate door 11*a* for opening and closing the clean space is provided between each load port 11 and the loader 12.

The atmospheric transfer device 13 has bifurcated (a pair of) forks 13*a* that support an outer peripheral portion on a back surface side of the wafer W, and transfers the wafer W in the ambient air atmosphere. For example, the atmospheric transfer device 13 takes the wafer W out from the FOUP set in each load port 11, and loads the wafer W into the clean space in the loader 12. The atmospheric transfer device 13 transfers the wafer W from the loader 12 to the aligning apparatus 14. Accordingly, the wafer W is aligned in the aligning apparatus 14. Further, the atmospheric transfer device 13 receives the wafer W aligned by the aligning apparatus 14, and loads the wafer W into the load-lock module LLM through the clean space. Further, when the wafer W after the substrate processing is loaded from the transfer module TM into the load-lock module LLM, the atmospheric transfer device 13 unloads the wafer W from the load-lock module LLM, and accommodates the wafer W in the FOUP through the clean space in the loader 12.

The load-lock module LLM is provided between the front module FM and the transfer module TM. The load-lock module LLM has two load-lock containers 21 that can switch between the ambient air atmosphere and the vacuum atmosphere. A gate 22 including a valve body (not illustrated) that hermetically closes the load-lock container 21 is provided between the load-lock module LLM and the front module FM. A gate 23 including a valve body (not illustrated) that hermetically closes the load-lock container 21 is provided between the load-lock module LLM and the transfer module TM. The load-lock module LLM includes a stage 24 on which the wafer W can be placed in the load-lock container 21.

One of the two load-lock containers 21 can transfer the wafer W to the transfer module TM by accommodating the wafer W loaded from the front module FM in the ambient air atmosphere and then reducing a pressure to the vacuum atmosphere. The other load-lock container among the two load-lock containers 21 can transfer the wafer W to the front module FM by accommodating the wafer W loaded from the transfer module TM in the vacuum atmosphere and then increasing a pressure to the ambient air atmosphere. The load-lock module LLM may include one load-lock container 21 between the front module FM and the transfer module TM.

The transfer module TM and the plurality of process modules PM transfer the wafer W and perform substrate processing in the vacuum atmosphere. In the substrate processing system 1 according to the present embodiment, four process modules PM (a first process module PM1, a second process module PM2, a third process module PM3, and a fourth process module PM4) are connected to one transfer module TM. Needless to say, in the substrate processing system 1, the number of the process modules PM is not particularly limited.

The transfer module TM includes a transfer container 31 in which the pressure can be reduced to the vacuum atmosphere, and a vacuum transfer device 32 disposed in the transfer container 31. The transfer container 31 is formed in a hexagonal (polygonal) box having a flat shape in a plan view. A plurality of (two) process modules PM are disposed on each of a pair of long sides of the transfer container 31.

The vacuum transfer device 32 is configured to be movable in a horizontal direction and a vertical direction and to rotate by an angle θ in the horizontal direction in the transfer container 31. The vacuum transfer device 32 includes two transfer arms that can operate independently of each other to replace the wafer W after the substrate processing with an unprocessed wafer W for the load-lock module LLM and each process module PM.

The plurality of process modules PM is connected to sides in an X-axis direction of the transfer container 31, which extends in a Y-axis direction. Specifically, the first process module PM1 and the second process module PM2 are provided side by side on one side of the transfer container 31. The third process module PM3 and the fourth process module PM4 are provided side by side on the other side of the transfer container 31.

Each process module PM includes a processing container 51 that accommodates the wafer W to perform the substrate processing. A gate 52 is provided between the transfer container 31 and each processing container 51 to communicate with each other in space and pass the wafer W therethrough, and a valve (not illustrated) for opening and closing the processing container 51 is disposed in the gate 52. The substrate processing performed by each process module PM may be any of a film formation process, an etching process, an asking process, a cleaning process, and the like. The process modules PM may perform substrate processing the same as each other, or substrate processing different from each other. The substrate processing system 1 may be configured to continuously perform a plurality of times (a plurality of types) of substrate processing via each process module PM, or may be configured to immediately perform unloading from the substrate processing system 1 after performing the substrate processing one time in any process module PM.

Figure 2:
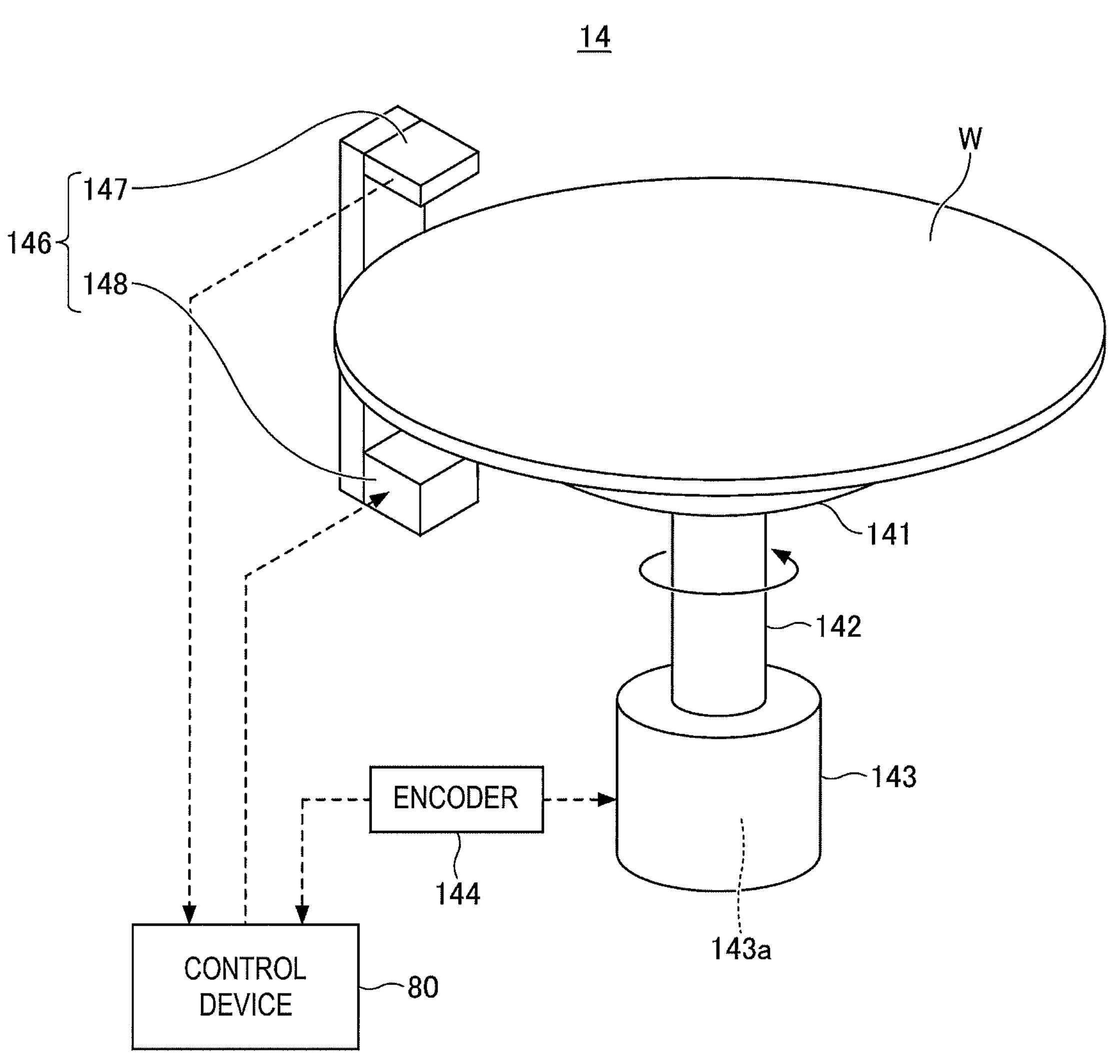
FIG. 2 is a schematic perspective view illustrating a state in which a wafer is placed on a stage inside an aligning apparatus.
Figure 3:
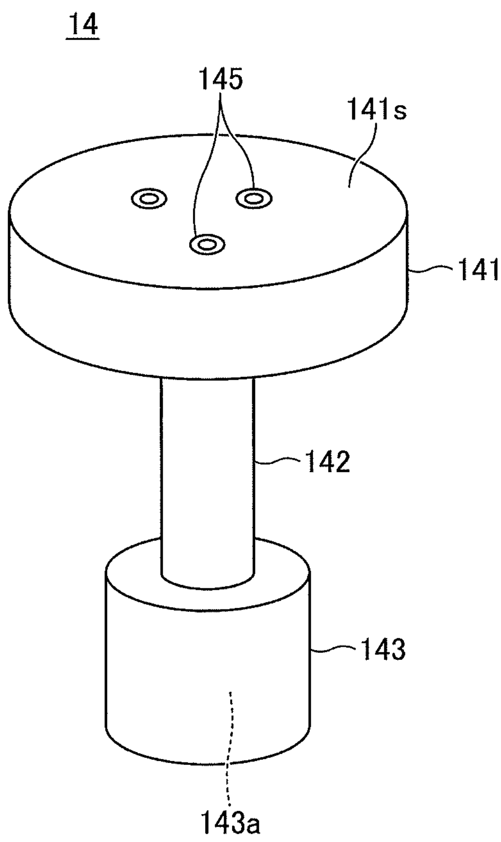
FIG. 3 is a schematic perspective view illustrating a configuration of a part of the aligning apparatus in a state in which the wafer is not present.

Next, the aligning apparatus 14 provided in the front module FM of the substrate processing system 1 will be described with reference to FIGS. 2 and 3. FIG. 2 is a schematic perspective view illustrating a state in which the wafer W is placed on a stage 141 inside the aligning apparatus 14. FIG. 3 is a schematic perspective view illustrating a configuration of a part of the aligning apparatus 14 in a state without the wafer W.

The aligning apparatus 14 includes the stage 141 on which the wafer W is placed, a spindle 142 that supports the stage 141, and a rotation mechanism unit 143 connected to a lower end of the spindle 142. The aligning apparatus 14 rotates the stage 141 and the spindle 142 around a vertical axis by rotation driving of the rotation mechanism unit 143. In the rotation mechanism unit 143, a motor 143*a* as a driving source, a rotation transmission mechanism (not illustrated) that transmits the rotation driving of the motor 143*a*, and an encoder 144 that detects a rotation angle (the rotation speed) of the motor 143*a* or the spindle 142 are provided.

A planar shape of the stage 141 is formed in a circular shape smaller than a planar shape of the wafer W. A diameter of the stage 141 is set to be smaller than a distance between the pair of forks 13*a* of the atmospheric transfer device 13 (see FIG. 1). Therefore, the atmospheric transfer device 13 places the wafer W on the stage 141 by lowering the pair of forks 13*a* downward from above the stage 141 when the wafer W is loaded into the aligning apparatus 14. Accordingly, a back surface-side central portion of the wafer W is placed on an upper surface of the stage 141.

The stage 141 is made of, for example, aluminum. A plurality of holding members 145 are provided on an upper surface 141*s* of the stage 141 as illustrated in FIG. 3. Each holding member 145 is fitted into each of a plurality of recesses (not illustrated) formed in the upper surface 141*s* of the stage 141, and slightly protrudes from the upper surface 141*s*. Further, the holding members 145 are disposed at equal intervals from each other on the same circumference around a rotation center of the upper surface 141*s* of the stage 141 as a base point. Each holding member 145 is made of, for example, a material that is elastic and has a large friction coefficient, such as rubber or resin. Each holding member 145 generates friction with the wafer W to reduce slip.

As illustrated in FIG. 2, the aligning apparatus 14 includes a sensor 146 that detects an outline (a shape of an outer peripheral edge) of the wafer W on an outer side of the stage 141 in a radial direction. The sensor 146 can be, for example, a transmissive optical sensor including a light-emitting unit 147 formed by a light-emitting element such as a light-emitting diode, and a light-receiving unit 148 formed by a light-receiving element such as a photodiode, a CCD sensor, or a CMOS sensor. A configuration of the sensor 146 is not particularly limited, and may be, for example, a reflection-type optical sensor.

The light-receiving unit 148 includes a plurality of light-receiving elements arranged along the radial direction of the stage 141, and causes a voltage drop corresponding to the number of the light-receiving elements that have received light. That is, in the detection of the outline position of the wafer W, a part of light emitted from the light-emitting unit 147 is blocked by the wafer W placed on the stage 141, while the rest of the light is received by the light-receiving unit 148. An output value of the light-receiving unit 148 of the sensor 146 is a received light amount that reaches the light-receiving unit 148 without being blocked by the wafer W, that is, a value corresponding to the position of the outline (the outer peripheral edge) of the wafer W.

Figure 4:
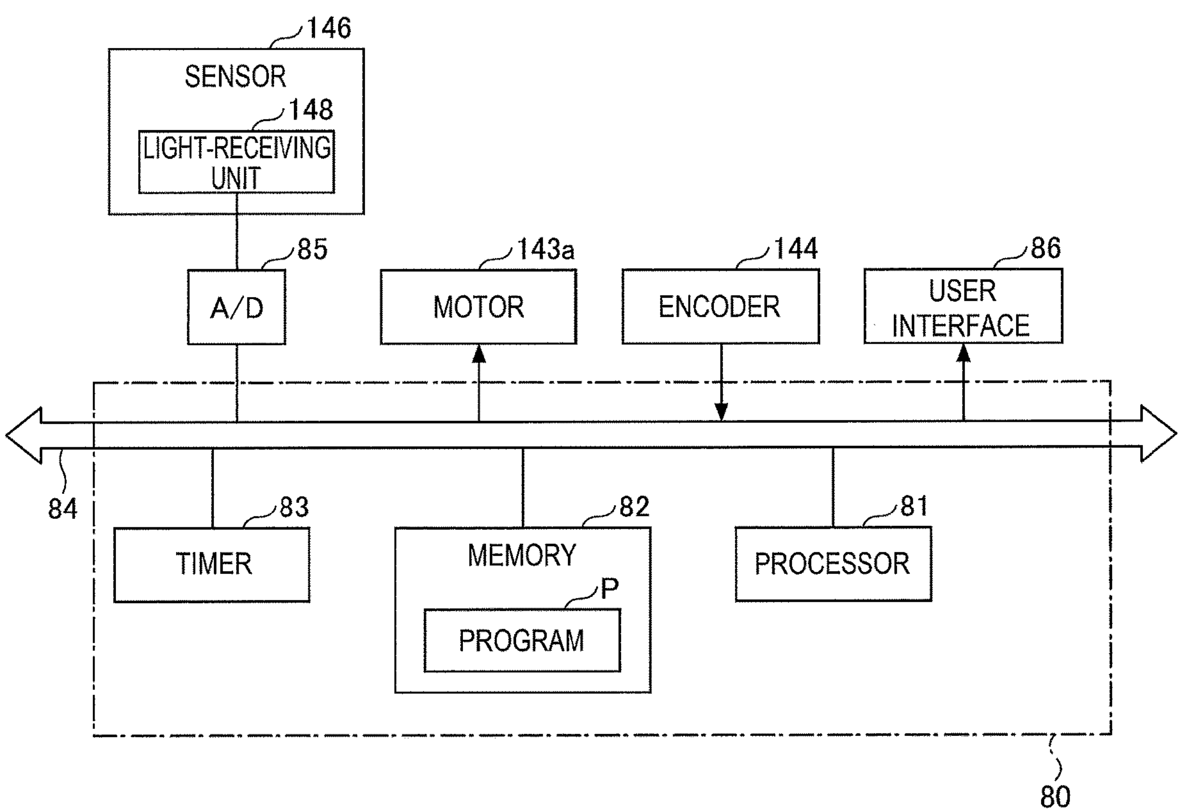
FIG. 4 is a block diagram illustrating a hardware configuration of a control device.

Next, a configuration of the control device 80 of the substrate processing system 1 will be described with reference to FIG. 4. FIG. 4 is a block diagram illustrating a hardware configuration of the control device 80.

The control device 80 can be applied to a computer in which a processor 81, a memory 82, a timer 83, an input and output interface (not illustrated), and the like are connected through a bus 84. The processor 81 is one component or a combination of a plurality of components among a central processing unit (CPU), a graphics processing unit (GPU), an application specific integrated circuit (ASIC), a field-programmable gate array (FPGA), a circuit implemented by a plurality of discrete semiconductors, and the like. The memory 82 is an appropriate combination of a volatile memory and a nonvolatile memory (e.g., a compact disk, a digital versatile disk (DVD), a hard disk, or a flash memory).

The memory 82 stores a program P for operating the substrate processing system 1, and a recipe such as a process condition of the substrate processing. A storage unit that stores a type of the wafer W and the rotation speed of the stage 141 when it is determined that a misalignment amount of the wafer W to be described later is less than a threshold value can be implemented by the memory 82. The processor 81 controls each component of the substrate processing system 1 by reading and executing the program P in the memory 82. The substrate processing system 1 may be configured such that a controller (not illustrated) is provided for each module and the control device 80 instructs each controller to control the entire system, or may be configured such that the control device 80 collectively controls an operation of each module. The control device 80 may be implemented by a host computer or a plurality of client computers that communicate information via a network.

A user interface 86, the motor 143*a*, the encoder 144, the sensor 146, and the like are connected to the control device 80 through the input and output interface. A detection signal detected by the light-receiving unit 148 of the sensor 146 is transmitted to the control device 80 via an analog-to-digital converter (A/D converter) 85 and stored in the memory 82 of the control device 80. Information on the outline of the wafer W stored in the memory 82 is used to determine whether the outline of the wafer W is normal or abnormal, and to calculate an eccentric amount and an eccentric direction of the wafer W.

Figures 5A, 5B:
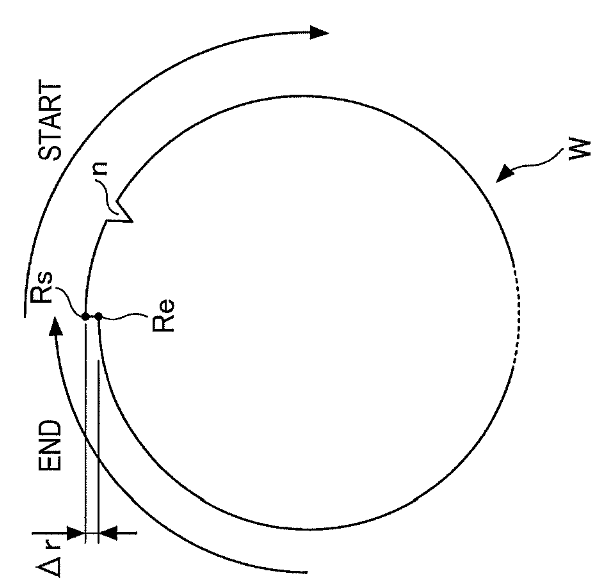
FIG. 5A and FIG. 5B are diagrams illustrating an example of an inspection of the outline of the wafer performed by the sensor.

FIG. 5A and FIG. 5B are diagrams illustrating an inspection of the outline of the wafer W performed by the sensor 146. FIG. 5A is a diagram illustrating misalignment of the wafer W during the rotation of the wafer W, and FIG. 5B is a graph illustrating outline data based on the information on the outline of the wafer W detected by the sensor 146. As illustrated in FIG. 5A and FIG. 5B, the control device 80 controls the aligning apparatus 14 to rotate the wafer W by one full rotation (360° rotation) at the set rotation speed. During the rotation of the wafer W, the control device 80 detects the outline position of the wafer W along a circumferential direction of the wafer W using the sensor 146.

The control device 80 receives the detection signal detected by the sensor 146 (information on the outline position of the wafer W), and stores the detection signal in the memory 82 in association with a position of the wafer W in a rotation direction. For example, by repeating the detection every predetermined sampling period by using the sensor 146, the control device 80 calculates the position of the wafer W in the rotation direction based on the rotation speed and the sampling period. Accordingly, the control device 80 can store, in the memory 82, the outline data in which the position of the wafer W in the rotation direction at every sampling period is associated with the outline position of the wafer W received from the sensor 146.

The wafer W according to the present embodiment has a notch n obtained by notching the outer peripheral edge radially inward at a predetermined location on the outer peripheral edge. The control device 80 can recognize a position of the notch n of the wafer W by detecting a large position change Rc of the wafer W in the notch n when the sensor 146 detects the outline. The recognized position of the notch n of the wafer W is used to align the position of the wafer W in the circumferential direction (a rotational position) with respect to the atmospheric transfer device 13 in the aligning apparatus 14.

Here, the aligning apparatus 14 reduces the slip of the wafer W by the holding members 145 of the stage 141. However, the wafer W may slip with respect to the stage 141 during the rotation due to a centrifugal force caused by the position and the rotation of the wafer W placed on the stage 141 and the like. When the wafer W does not slip with respect to the stage 141 during the rotation, the outline position of the wafer W is detected as illustrated by a dotted line in FIG. 5B during one full rotation of the stage 141. In this case, the outline position of the wafer W at start of the rotation (hereinafter, referred to as a rotation start point Rs) and the outline position of the wafer W at end of the rotation (hereinafter, referred to as a rotation end point Re) substantially coincide with each other. However, when the wafer W slips, the outline position of the wafer W is detected as illustrated by a solid line in FIG. 5B during one full rotation of the stage 141, and the rotation start point Rs and the rotation end point Re are misaligned with each other as illustrated by the solid lines in FIGS. 5A and 5B.

That is, the detection signal (the voltage value) output from the light-receiving unit 148 of the sensor 146 also changes due to the slip of the wafer W, and the outline position of the wafer W received from the sensor 146 is also stored in the memory 82 as outline data having heights different from each other at the start of the rotation and the end of the rotation, as illustrated in FIG. 5B. In this way, when the rotation start point Rs and the rotation end point Re are misaligned, the control device 80 cannot determine whether the outline position of the wafer W changes by the notch n, and mistakenly detects the position of the notch n, a shape abnormality of the wafer W, or the like.

Specifically, the slip of the wafer W will be described in detail using the outline data illustrated in FIG. 5B. In an initial stage of rotation of the wafer W and an intermediate stage of rotation of the wafer W, the outline data illustrated by the solid line, in which the wafer W slips during the rotation, deviates from ideal outline data (see the dotted line) in which the wafer W does not slip. The slip of the wafer W at the initial stage of rotation occurs during an acceleration period in which the rotation speed of the stage 141 increases to a target rotation speed. That is, since a force caused by a large acceleration (change in kinetic energy: impulse) during the rotation of the stage 141 is larger than a frictional force between the holding members 145 and the wafer W, the wafer W may be shifted with respect to the stage 141. With respect to the above, the slip of the wafer W during the intermediate stage of rotation occurs in a constant speed period in which the stage 141 rotates at a constant rotation speed (the target speed). In this case, the shift occurs due to the centrifugal force caused by the rotation speed of the stage 141 being applied to the wafer W. That is, the slip of the wafer W includes a factor during the acceleration of the stage 141 (including a deceleration when the wafer W is decelerated at the time of stopping the rotation) and a factor during a constant speed of the stage 141. There is a pattern in which both factors are combined as in FIG. 5B, and a pattern of either factor alone.

In this way, the misalignment between the rotation start point Rs and the rotation end point Re is caused by a high rotation speed or acceleration of the wafer W. Therefore, when the rotation start point Rs and the rotation end point Re are misaligned at the time of rotating the wafer W at an initial speed (the first speed) and an initial acceleration (the first acceleration) in initial detection of the outline position of the wafer W, the control device 80 rotates the wafer W at a second speed lower than the initial speed, at a second acceleration lower than the initial acceleration, or both. The second speed and the second acceleration may be gradually set to a low speed and a low acceleration, or may be set to a minimum speed or a minimum acceleration at which the wafer W does not slip with respect to the stage 141 by performing an experiment, a simulation, or the like. The control device 80 then causes the sensor 146 to detect the outline of wafer W again as the wafer W rotates at the second speed, the second acceleration, or both. Accordingly, when the rotation start point Rs and the rotation end point Re coincide with each other, it can be recognized that the wafer W is misaligned due to the slip in the previous rotation.

First Embodiment

In order to perform the above processing, the control device 80 according to the first embodiment forms a functional unit as illustrated in FIG. 6 in the detection of the outline position of the wafer W by the aligning apparatus 14. FIG. 6 is a block diagram illustrating functional blocks of the control device 80 according to the first embodiment. Specifically, a speed acquisition unit 90, a rotation controller 91, an outline data acquisition unit 92, a data storage area 93, a determination processor 94, and a correction amount calculator 95 are formed inside the control device 80.

The speed acquisition unit 90 acquires information on the rotation speed (a speed result) of the motor 143*a* or the spindle 142 which is detected by the encoder 144, stores the information in the memory 82, and outputs the information to the rotation controller 91.

The rotation controller 91 generates speed command information so that the speed result becomes a preset target speed based on the target speed and the speed result acquired by the speed acquisition unit 90. The target speed is obtained by, for example, the rotation controller 91 reading the initial speed (the first speed) stored in the data storage area 93 at the initial stage after the wafer W is placed on the stage 141. The initial speed is information including the initial acceleration such as a speed increase until the constant speed (the target speed) is attained or a speed decrease until the rotation at the constant speed is stopped. In a "retry operation" in which the detection of the outline position of the wafer W and a determination as to whether the misalignment amount between the rotation start point Rs and the rotation end point Re falls within an allowable range are performed again, the second speed (the minimum speed in the present embodiment) set by the determination processor 94 is acquired and set as the target speed. The minimum speed is also information including the minimum acceleration such as the speed increase until the constant speed (the target speed) is attained or the speed decrease until the rotation at the constant speed is stopped. The rotation controller 91 transmits the generated speed command information to a driver (not illustrated) to adjust a power amount supplied to the motor 143*a* by the driver, thereby controlling the rotation speed of the motor 143*a*. Accordingly, the rotation mechanism unit 143 of the aligning apparatus 14 can rotate the stage 141 and the wafer W at the commanded target speed.

The outline data acquisition unit 92 acquires the detection signal (the information on the outline of the wafer W) detected by the sensor 146, and stores the detection signal in the data storage area 93 of the memory 82 as the outline data in which the position of the wafer W in the rotation direction and the outline position of the wafer W are associated with each other.

The determination processor 94 reads the outline data stored in the data storage area 93, determines the outline position of the wafer W, calculates the eccentric amount of the wafer W, and sets the rotation speed of the stage 141 again as necessary. Therefore, the determination processor 94 includes a shape determination unit 94*a*, a speed determination unit 94*b*, a speed setting unit 94*c*, and an eccentric amount determination unit 94*d*.

Based on the outline data read from the data storage area 93, the shape determination unit 94*a* determines whether the rotation start point Rs and the rotation end point Re coincide with each other, or whether the misalignment amount between the rotation start point Rs and the rotation end point Re falls within the allowable range. For example, the shape determination unit 94*a* calculates a difference Δr (the misalignment amount: see FIG. 5A and FIG. 5B) between the rotation start point Rs and the rotation end point Re, and determines whether the calculated difference Δr is greater than or equal to a shape determination threshold value (not illustrated). Because a direction in which the wafer W is misaligned is unknown, the difference Δr may be calculated as an absolute value. The shape determination unit 94*a* determines that the outline of the wafer W is normal when the difference Δr is less than the shape determination threshold value, and determines that the outline of the wafer W is abnormal according to a result of the retry operation when the difference Δr is greater than or equal to the shape determination threshold value.

The speed determination unit 94*b* determines whether the target speed of rotation of the stage 141 set in the rotation controller 91 is the initial speed (the first speed) or the minimum speed (the second speed). The minimum speed is a speed at which the wafer W does not slip. Therefore, when the target speed is the minimum speed and the difference Δr is greater than or equal to the shape determination threshold value, the wafer W does not slip, and thus the speed determination unit 94*b* determines that the outline of the wafer W is abnormal. At this time, the control device 80 notifies a user of an abnormality of the outline of the wafer W through the user interface 86. The control device 80 may stop an operation of the aligning apparatus 14 or the like, or may take out the wafer W, in which the abnormality has been recognized, from the aligning apparatus 14 by the atmospheric transfer device 13 and return the wafer W to the load port 11.

The speed setting unit 94*c* resets the rotation speed of the stage 141 to perform the retry operation when the target speed is the initial speed in the speed determination unit 94*b*. For example, the speed setting unit 94*c* reads the minimum speed (including the minimum acceleration) pre-stored in the data storage area 93, and outputs the information to the rotation controller 91. Accordingly, the rotation controller 91 sets a new target speed (the minimum speed), and rotates the stage 141 and the wafer W according to the target speed.

Figures 7A, 7B:
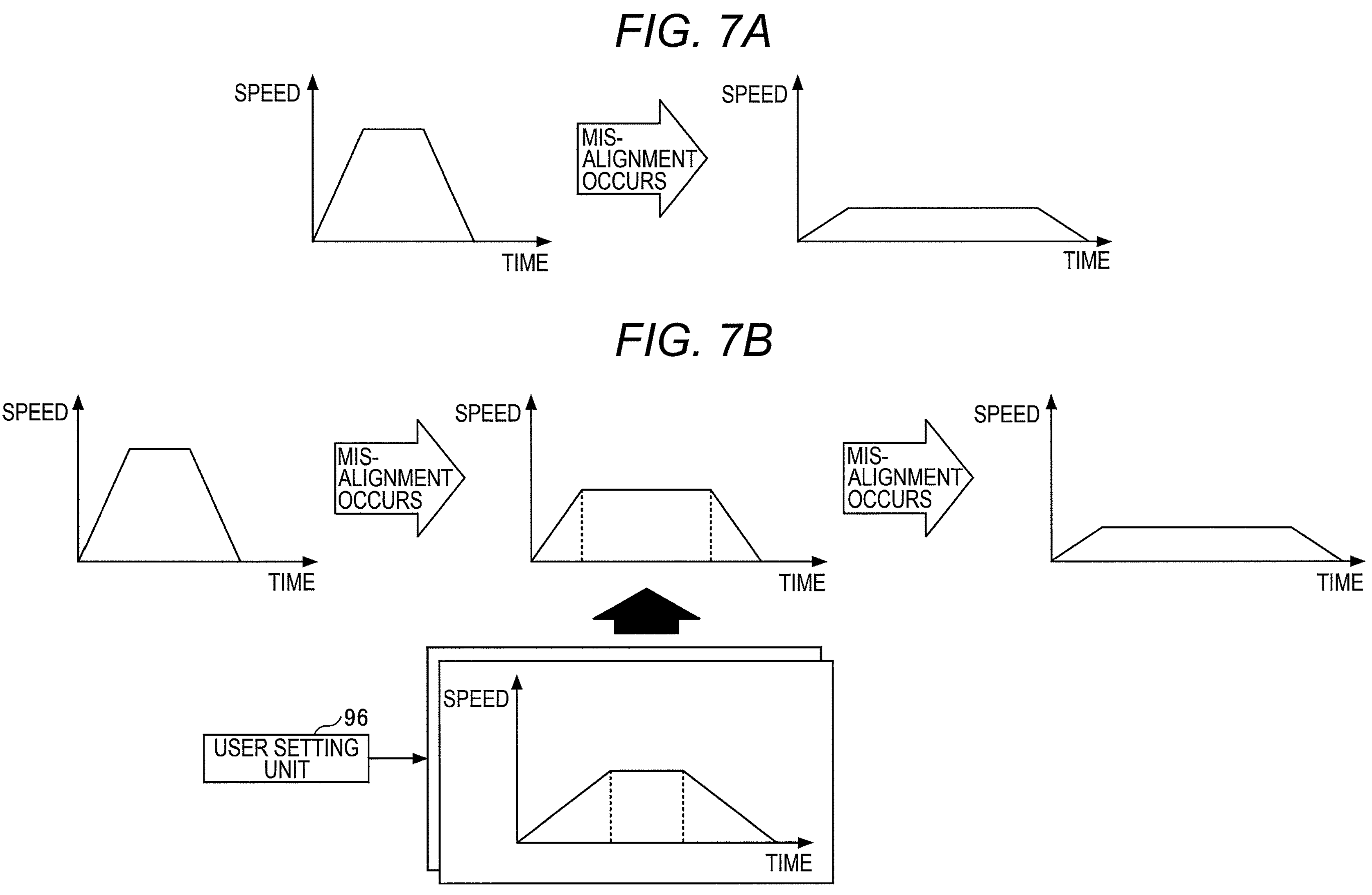
FIG. 7A and FIG. 7B are diagrams illustrating settings of a rotation speed of the stage and the wafer.

FIG. 7A and FIG. 7B are diagrams illustrating settings of the rotation speed of the stage 141 and the wafer W, in which FIG. 7A illustrates a speed change according to the first embodiment, and FIG. 7B illustrates a speed change according to a second embodiment. As illustrated in the left diagram of FIG. 7A, the rotation speed of the stage 141 and the wafer W are set to high rotation speed and acceleration as the initial speed. Then, when it is determined at the initial speed that the outline position of the wafer W is abnormal, the wafer W may have slipped, and thus the control device 80 switches to the second speed lower than the initial speed (the minimum speed and the minimum acceleration) to rotate the stage 141 and the wafer W (see the right diagram of FIG. 7A). The control device 80 decreases both the constant speed (the target speed) and the acceleration (including the deceleration) as the second speed lower than the initial speed. Alternatively, the control device 80 may reduce only the constant speed without changing the acceleration, or may reduce only the acceleration without changing the constant speed.

The minimum speed and the minimum acceleration are set to appropriate values according to mechanical characteristics of the holding members 145 and the rotation mechanism unit 143. For example, the minimum speed may be ⅓ or less of the initial speed, more preferably a range of ⅕ to 1/20 of the initial speed. When the minimum speed is greater than ⅓ of the initial speed, the centrifugal force applied to the wafer W is large, and the wafer W may slip again. When the minimum speed is less than 1/20 of the initial speed, an entire operation of the aligning apparatus 14 may be slowed, which may hinder the processing of the substrate processing system 1 or reduce productivity.

When it is determined that the misalignment amount between the rotation start point Rs and the rotation end point Re is outside the allowable range at the first speed illustrated in the left diagram of FIG. 7A, the control device 80 performs the retry operation of detecting the outline position of the wafer W when the wafer W rotates at the minimum speed, comparing the misalignment between the rotation start point Rs and the rotation end point Re based on the outline data, and determining whether the misalignment amount between the rotation start point Rs and the rotation end point Re is within the allowable range. Accordingly, the control device 80 can accurately determine the abnormality in the outline of the wafer W while excluding the slip.

The eccentric amount determination unit 94*d* of the determination processor 94 calculates an eccentric direction and an eccentric amount as a misalignment of a center of the wafer W with respect to a rotation center of the stage 141 based on the outline data, and compares the calculated eccentric amount with an eccentric amount threshold value to determine whether the wafer W is normal or abnormal. The eccentric amount determination unit 94*d* determines that the wafer W is normal when the eccentric amount of the wafer W is less than the eccentric amount threshold value, and determines that the wafer W is abnormal when the eccentric amount of the wafer W is greater than or equal to the eccentric amount threshold value. When the eccentric amount of the wafer W is greater than or equal to the eccentric amount threshold value, the control device 80 notifies the user of the abnormality of the wafer W through the user interface 86.

The correction amount calculator 95 calculates a correction amount for correcting movement of the atmospheric transfer device 13 when the atmospheric transfer device 13 receives the wafer W from the stage 141, based on the calculated eccentric amount and eccentric direction of the wafer W. Accordingly, the substrate processing system 1 may hold the wafer W by the atmospheric transfer device 13 in a state in which the wafer W is accurately aligned.

The substrate processing system 1 according to the present embodiment is basically implemented as described above, and an operation thereof will be described below.

In substrate processing on the wafer W, first, the control device 80 of the substrate processing system 1 controls the atmospheric transfer device 13 to take out the wafer W from the FOUP placed in the load port 11. Further, the control device 80 transfers the wafer W to the aligning apparatus 14 through the clean space of the loader 12 by the atmospheric transfer device 13, and transfers the wafer W to the stage 141. As described above, the distance between the pair of forks 13*a* of the atmospheric transfer device 13 is larger than the diameter of the stage 141, so as not to interfere with the stage 141. The atmospheric transfer device 13 can place the wafer W on the stage 141 by lowering the pair of forks 13*a* holding the wafer W from above the stage 141.

Figure 8:
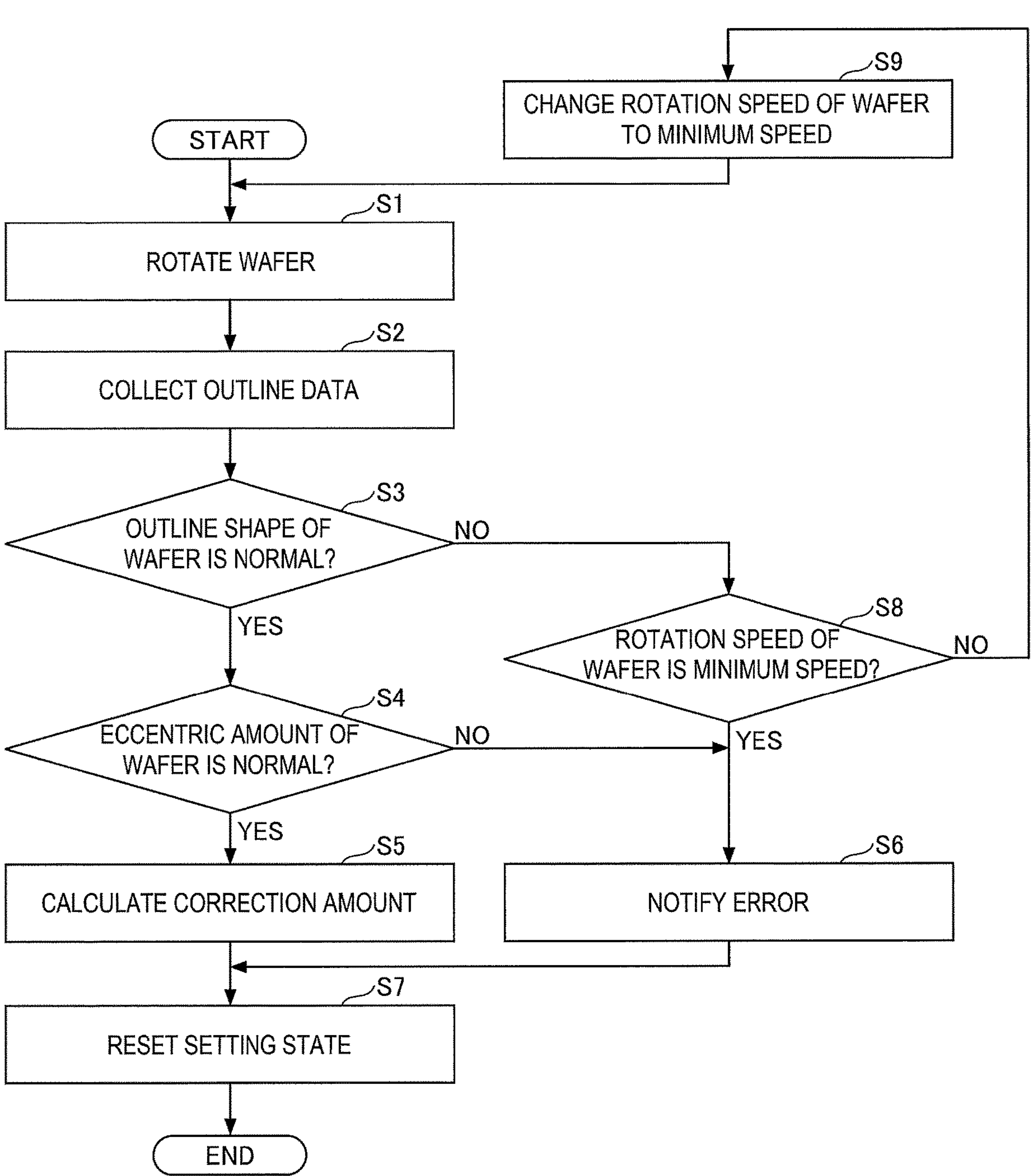
FIG. 8 is a flowchart illustrating a processing flow of a substrate shape monitoring method according to the first embodiment.

FIG. 8 is a flowchart illustrating a processing flow of a substrate shape monitoring method according to the first embodiment. After placing the wafer W on the stage 141, the control device 80 performs the substrate shape monitoring method according to the processing flow illustrated in FIG. 8.

The rotation controller 91 of the control device 80 sets the target speed during the rotation of the stage 141, and controls the rotation mechanism unit 143 to rotate the stage 141 and the wafer W around the vertical axis (step S1). When the wafer W is initially rotated after being placed on the stage 141, the rotation controller 91 sets the initial speed (including the initial acceleration) pre-stored in the data storage area 93 as the target speed. During the rotation of the stage 141, the speed acquisition unit 90 acquires the speed result detected by the encoder 144, and the rotation controller 91 controls the rotation speed of the motor 143*a* so that the acquired speed result becomes the target speed.

During the rotation of the wafer W, the outline data acquisition unit 92 detects the outline position of the wafer W by using the sensor 146, and continuously stores, in the data storage area 93, the outline data in which the position of the wafer W in the rotation direction and the transmitted outline position of the wafer W are associated with each other (step S2). Hereinafter, the outline data of the wafer W rotating at the initial speed will be referred to as first outline data, and the outline data of the wafer W rotating at the minimum speed will be referred to as second outline data. As described above, the position of the wafer W in the rotation direction can be calculated based on the rotation speed acquired by the speed acquisition unit 90 and the sampling period of the sensor 146. The outline data is continually acquired until the wafer W rotates by one full rotation. After acquiring the outline data, the control device 80 temporarily stops the rotation of the wafer W.

The shape determination unit 94*a* of the determination processor 94 reads the first outline data stored in the data storage area 93, and determines whether the outline position of the wafer W is normal (step S3). At this time, the shape determination unit 94*a* compares the rotation start point Rs and the rotation end point Re of the first outline data, and determines whether the rotation start point Rs and the rotation end point Re are misaligned by the threshold value or greater (the difference Δr is greater than or equal to the shape determination threshold value). If the outline position of the wafer W is normal (step S3: YES), the procedure proceeds to step S4, and if the outline position of the wafer W is abnormal (step S3: NO), the procedure proceeds to step S8.

In step S4, the eccentric amount determination unit 94*d* of the determination processor 94 calculates the eccentric amount and the eccentric direction of the wafer W to determine whether the eccentric amount of the wafer W is normal. If the eccentric amount of the wafer W is normal (step S4: YES), the procedure proceeds to step S5, and if the eccentric amount of the wafer W is abnormal (step S4: NO), the procedure proceeds to step S6.

In step S5, the correction amount calculator 95 calculates the correction amount for correcting the movement of the atmospheric transfer device 13 based on the eccentric amount and the eccentric direction of the wafer W.

In step S6, the determination processor 94 determines that the outline of the wafer W is abnormal, and notifies the abnormality (the error) of the wafer W through the user interface 86. Accordingly, the user of the substrate processing system 1 can recognize the abnormality of the wafer W at an early stage.

The control device 80 resets a setting state of the rotation speed of the stage 141 set by the rotation controller 91 (step S7), and then ends the current substrate shape monitoring method. In the substrate shape monitoring method, when the outline of the wafer W is not abnormal, the notch n is recognized, and the eccentric amount and the eccentric direction of the wafer W are calculated, the substrate processing system 1 aligns the wafer W with the atmospheric transfer device 13 based on this information. At this time, the control device 80 rotates the stage 141 and the wafer W to dispose the notch n at a predetermined circumferential position based on the position of the notch n. Further, the control device 80 controls the atmospheric transfer device 13 based on the correction amount and the eccentric direction, and moves the atmospheric transfer device 13 to a position at which the center of the wafer W placed on the stage 141 and the center of the pair of forks 13*a* coincide with each other. The atmospheric transfer device 13 can hold the wafer W in a state in which the position of the wafer W is accurately aligned by raising the pair of forks 13*a*.

When it is determined in step S3 that the outline position of the wafer W is abnormal, the control device 80 determines whether the target speed of the wafer W is the minimum speed at the speed determination unit 94*b* (step S8). Here, when the wafer W is initially rotated after the wafer W is placed on the stage 141, the initial speed is set as the target speed. Therefore, the speed determination unit 94*b* determines that the rotation speed of the wafer W is not the minimum speed (step S8: NO), and the procedure proceeds to step S9.

In step S9, the speed setting unit 94*c* reads the minimum speed stored in the data storage area 93 and outputs the read speed to the rotation controller 91, thereby setting the minimum speed (including the minimum acceleration) as the target speed of the rotation controller 91. After step S9, the control device 80 returns to step S1, and performs the retry operation of repeating steps S1 and S2 again. In the retry operation, the rotation controller 91 rotates the wafer W at the set minimum speed to prevent the wafer W from slip with respect to the stage 141. Accordingly, in step S2, the second outline data of the wafer W, in which the factor of the slip is excluded, is stored in the data storage area 93. In step S3, the shape determination unit 94*a* may determine whether the outline of the wafer W is normal based on the second outline data. Therefore, when the outline of the wafer W is normal in step S3, the wafer W can be appropriately aligned by performing the processing starting from step S4.

When the rotation start point Rs and the rotation end point Re are misaligned by the threshold value or greater even in the second outline data in step S3, the procedure proceeds to step S8, and the speed determination unit 94*b* determines whether the rotation speed of the wafer W is the minimum speed again. When the rotation speed of the wafer W is the minimum speed (step S8: YES), it can be determined that the outline of the wafer W is abnormal in a state in which the factor of the slip of the wafer W is excluded. Therefore, the procedure proceeds to step S6, and the determination processor 94 notifies the abnormality (the error) of the wafer W through the user interface 86. Accordingly, the user of the substrate processing system 1 can reliably recognize the abnormality of the wafer W.

As described above, in the substrate shape monitoring method according to the first embodiment, when it is determined that the wafer W rotates at the initial speed and the outline of the wafer W is abnormal, the rotation speed of the wafer W is reset to the minimum speed, and the outline of the wafer W is determined again. Accordingly, the outline of the wafer W may be accurately determined while excluding the factor of the slip of the wafer W with respect to the stage 141. As a result, the substrate processing system 1 can improve a production yield of the wafer W without remarkably lowering an efficiency of the substrate processing.

Second Embodiment

The substrate processing system 1 and the substrate shape monitoring method according to the present disclosure are not limited to the above embodiment, and can be applied to various embodiments. Next, a substrate processing system 1A and a substrate shape monitoring method according to a second embodiment will be described.

FIG. 9 is a block diagram illustrating functional blocks of a control device 80A of the substrate processing system 1A according to the second embodiment. As illustrated in FIG. 9, the control device 80A in the substrate processing system 1A according to the second embodiment is different from the control device 80 according to the first embodiment in processing content. That is, in the second embodiment, the second speed is set to a plurality of speeds (an intermediate speed and the minimum speed) so that the rotation speed gradually decreases when it is determined that the misalignment amount of the outline position of the substrate is greater than or equal to the threshold value through a retry operation. The control device 80A repeats the retry operation of reducing the second speed until it is determined that the misalignment amount of the outline position of the wafer W is less than the shape determination threshold value, or until the preset minimum speed is reached. Alternatively, the control device 80A may have a plurality of accelerations (an intermediate acceleration and the minimum acceleration), and may repeat a retry operation such that the acceleration (including the deceleration) during the rotation is gradually reduced when it is determined the misalignment amount of the outline position of the substrate is greater than or equal to the threshold value through the retry operation. That is, the control device 80A may have a configuration in which at least one or both among the plurality of rotation speeds and the plurality of accelerations are gradually lowered. In the application, the control device 80A may gradually reduce the rotation speed and the acceleration in an alternate manner.

Specifically, the control device 80A includes a user setting unit 96 and a next speed setting unit 98, in addition to the speed acquisition unit 90, the rotation controller 91, the outline data acquisition unit 92, the data storage area 93, the determination processor 94, and the correction amount calculator 95. The control device 80A allows the user to set the rotation speed of the wafer W in the aligning apparatus 14.

For example, the user setting unit 96 causes the user to set the intermediate speed which is the rotation speed of the wafer W, the intermediate acceleration, or both by displaying a speed setting screen (not illustrated) through the user interface 86. The intermediate speed is a speed between the initial speed and the minimum speed. For example, the speed setting screen may have a configuration in which a range of the intermediate speed that can be set is displayed to allow the user to input or select the intermediate speed. Alternatively, the speed setting screen may not allow input of a rotation speed equal to or higher than the initial speed, a rotation speed equal to or lower than the minimum speed, or both. When the wafer W slips at the initial speed, the control device 80A can appropriately acquire the outline data of the wafer W while reducing the slip of the wafer W by rotating the wafer W at the set intermediate speed.

By allowing the user to set the intermediate speed in this way, the control device 80A can determine the abnormality of the outline position of the wafer W while gradually lowering the rotation speed of the wafer W in an order of the initial speed, the intermediate speed, and the minimum speed, as illustrated in FIG. 7B. The control device 80A is not limited to a configuration in which only one intermediate speed is set, and may be a configuration in which a plurality of intermediate speeds can be set.

The user setting unit 96 is not limited to setting a constant speed (the target speed) in setting the intermediate speed, and may be a configuration in which an acceleration period or a deceleration period (that is, the acceleration) is set in the rotation of the wafer W. As described above, the wafer W may slip due to a large acceleration or deceleration during the rotation of the wafer W. The control device 80A can change the acceleration period or the deceleration period, so that the factor of the slip due to the acceleration or the deceleration can be reduced. For example, the user setting unit 96 may display a trapezoidal speed pattern (see the central diagram of FIG. 7B) on the speed setting screen, and may allow adjustment or selection of the acceleration period or the deceleration period under an operation of the user.

Alternatively, the control device 80A may include an automatic setting unit 97 that automatically sets the intermediate speed, the acceleration or both, as illustrated by a dotted line in FIG. 9. For example, the automatic setting unit 97 may set the intermediate speed and the intermediate acceleration based the outline data obtained when the wafer W is rotated at the initial speed. As an example, the automatic setting unit 97 sets a speed close to the minimum speed as the intermediate speed when the difference Δr between the rotation start point Rs and the rotation end point Re is large, and sets a speed close to the initial speed as the intermediate speed when the difference Δr is small. Alternatively, for example, the automatic setting unit 97 may set the intermediate speed based on the eccentric amount of the wafer W when the wafer W is rotated at the initial speed.

The automatic setting unit 97 may estimate a timing at which the slip occurs using past outline data and adjust the intermediate speed, the intermediate acceleration, or both according to the estimated timing of the slip. For example, when it is recognized that the slip occurs during the initial stage of the rotation of the wafer W based on the outline data, the intermediate speed is set while lowering the acceleration and extending the acceleration period. The timing at which the slip occurs can be estimated by extracting a location at which a waveform (a sine wave or a cosine wave) of the outline data suddenly changes from a normal waveform (a waveform indicated by a dotted line in FIG. 5B). Alternatively, the automatic setting unit 97 may perform learning using a plurality of pieces of outline data stored in the data storage area 93, and may estimate the timing at which the slip occurs by calculating a degree of correlation between training data and the current outline data.

The next speed setting unit 98 is a functional unit that determines whether the rotation speed of the current wafer W is to be applied to the speed at which the next wafer W is initially rotated after the next wafer W is placed on the stage 141, and appropriately sets the rotation speed of the next wafer W. For example, when it is determined that the outline of the wafer W is normal when the wafer W is rotated at the intermediate speed, the next speed setting unit 98 sets the rotation speed of the next wafer W to the intermediate speed. Accordingly, the outline data of the next wafer W can be acquired by rotating the wafer W in a state in which a possibility of slip of the wafer W is reduced.

At this time, the next speed setting unit 98 may perform processing of adopting the rotation speed of the current wafer W for a wafer W taken out from the same FOUP (the load port 11), and returning to the initial speed when changing to another FOUP.

Figure 10:
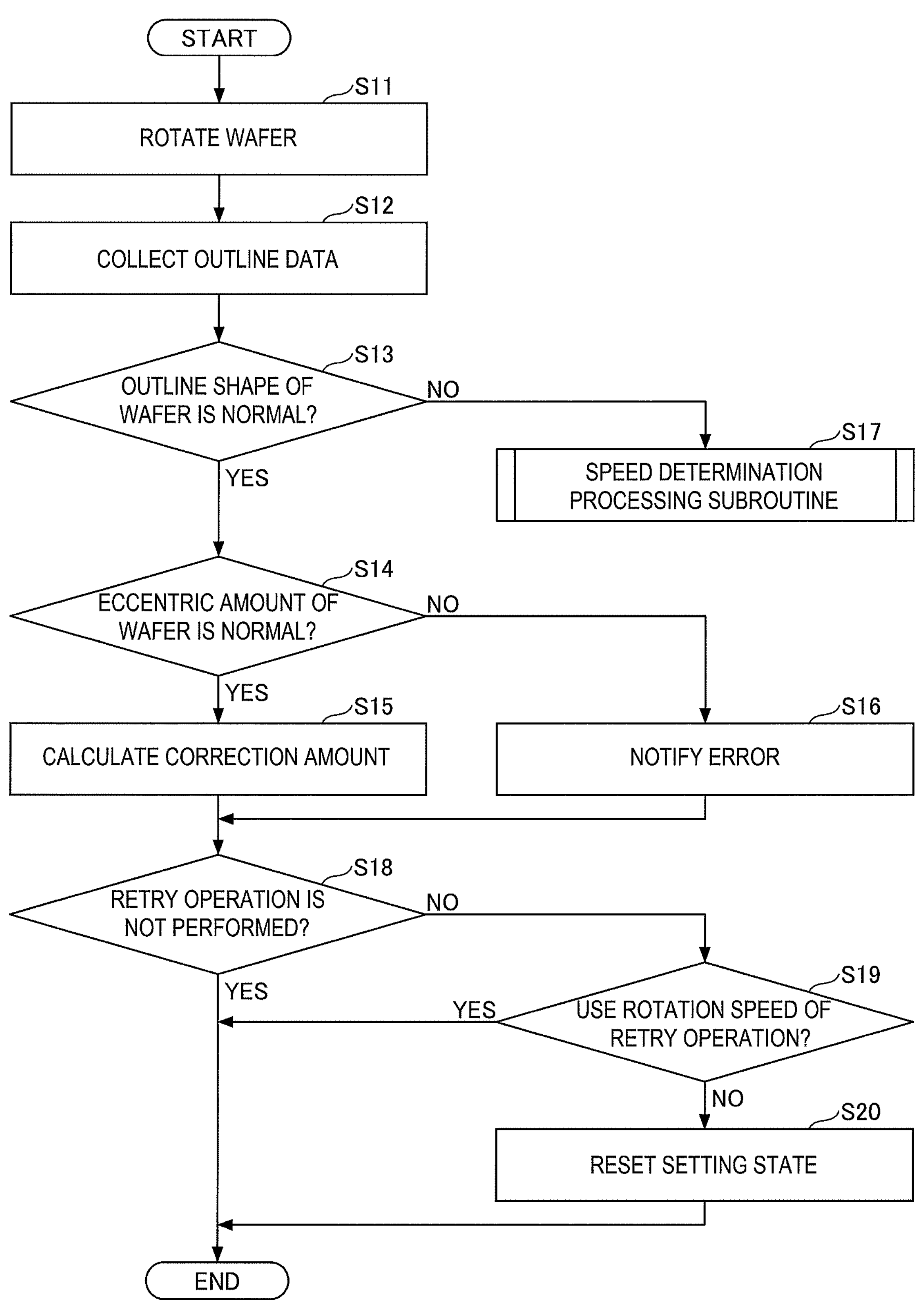
FIG. 10 is a flowchart illustrating a processing flow of a substrate shape monitoring method according to the second embodiment.
Figure 11:
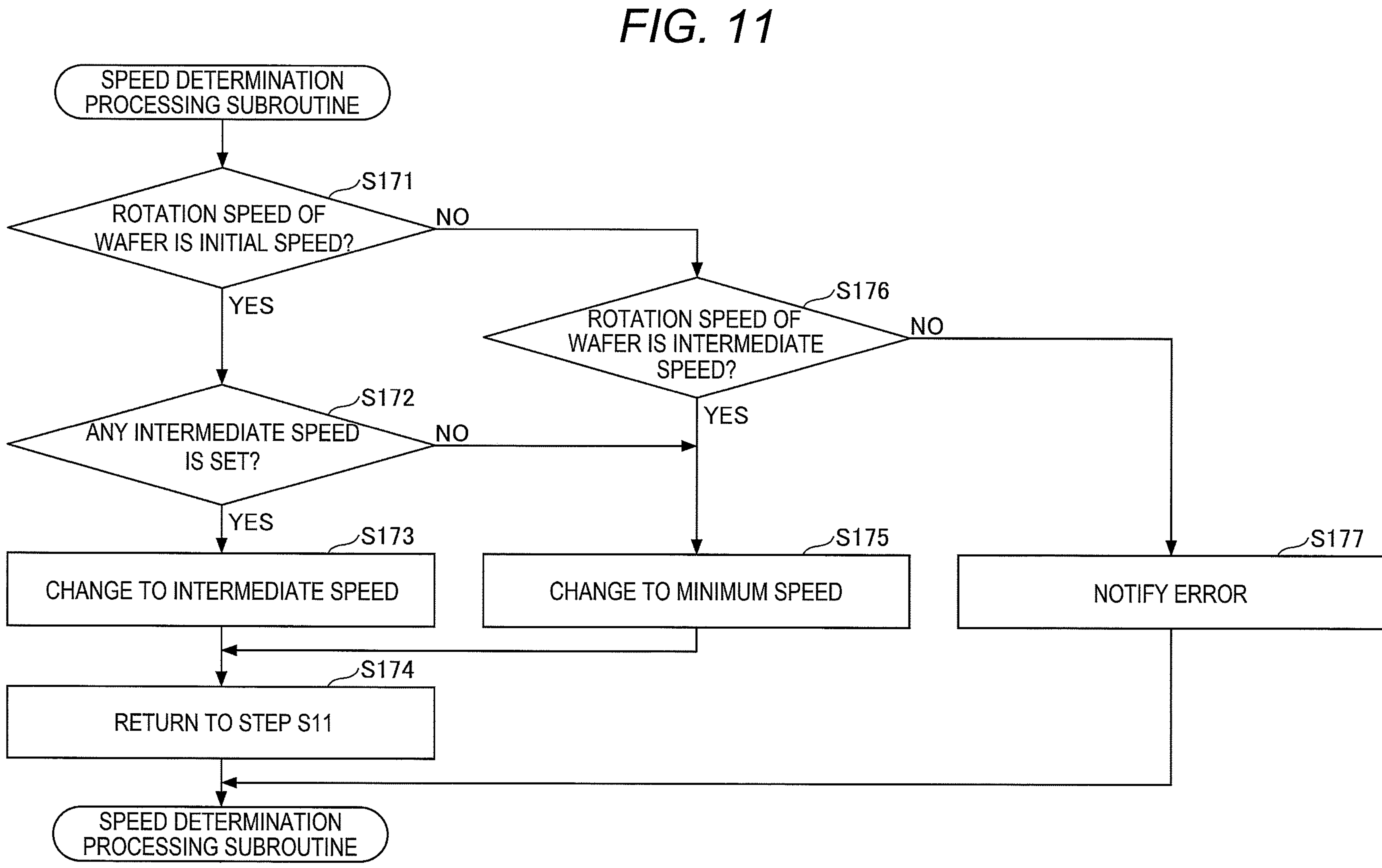
FIG. 11 is a flowchart illustrating a speed determination processing subroutine in FIG. 10.

The substrate processing system 1A according to the second embodiment is basically implemented as described above, and an operation thereof will be described below with reference to FIGS. 10 and 11. FIG. 10 is a flowchart illustrating a processing flow of the substrate shape monitoring method according to the second embodiment. FIG. 11 is a flowchart illustrating a speed determination processing subroutine in FIG. 10.

The processing flow from step S11 to step S16 in the substrate shape monitoring method according to the second embodiment performs the processing the same as step S1 to step S6 in the substrate shape monitoring method according to the first embodiment (see FIG. 8). Therefore, the description of specific processing will be omitted. With respect to the above, when it is determined in step S13 that the outline position of the wafer W is abnormal (step S13: NO), the procedure proceeds to step S17, and the control device 80A performs the speed determination processing subroutine.

As illustrated in FIG. 11, in the speed determination processing subroutine, first, the speed determination unit 94*b* determines whether the rotation speed of the wafer W is the initial speed (including the initial acceleration) (step S171). If the rotation speed of the wafer W is the initial speed (step S171: YES), the procedure proceeds to step S172, and if the rotation speed of the wafer W is other than the initial speed (step S171: NO), the procedure proceeds to step S176.

In step S172, the speed determination unit 94*b* determines whether the intermediate speed, the intermediate acceleration, or both are set by the user setting unit 96 or the automatic setting unit 97. When the intermediate speed, the intermediate acceleration, or both have been set (step S172: YES), the procedure proceeds to step S173, and when no intermediate speed is set, the procedure proceeds to step S175.

In step S173, the speed setting unit 94*c* sets the rotation speed to the set intermediate speed, sets the acceleration to the set intermediate acceleration, or sets the rotation speed to the set intermediate speed and sets the acceleration to the set intermediate acceleration. The intermediate speed is the target speed (the constant speed) between the initial speed and the minimum speed. The intermediate acceleration is between the initial acceleration and the minimum acceleration and is appropriately set with an acceleration period, a deceleration period, or both. Hereinafter, a case of setting the intermediate speed, including the intermediate acceleration, will be described. After the intermediate speed is set, the control device 80A returns to step S11 (step S174) and ends the speed determination processing subroutine. Accordingly, when the wafer W is rotated again in the retry operation, the control device 80A rotates the wafer W at the intermediate speed. In step S12, the outline data (the second outline data) of the wafer W rotating at the intermediate speed is stored.

When it is determined that no intermediate speed is set in step S172, the speed setting unit 94*c* sets the minimum speed, the minimum acceleration, or both stored in the data storage area 93 (step S175). Hereinafter, a case of setting the minimum speed, including the minimum acceleration, will be described. After the minimum speed is set, the control device 80A returns to step S11 (step S174) and ends the speed determination processing subroutine. Accordingly, when the wafer W is rotated again in the retry operation, the control device 80A rotates the wafer W at the minimum speed. In step S12, the outline data (third outline data) of the wafer W rotating at the minimum speed is stored.

When the rotation speed of the wafer W is not the initial speed in step S171, the speed determination unit 94*b* then determines whether the rotation speed of the wafer W is the intermediate speed (step S176). The rotation speed of the wafer W being the intermediate speed (step S176: YES) indicates that the wafer W slips even if the rotation speed of the wafer W is set to the intermediate speed. Therefore, the procedure proceeds to step S175, and the speed setting unit 94*c* changes the rotation speed of the wafer W to the minimum speed. Starting from step S175, the same processing flow as described above is performed. Accordingly, the control device 80A can obtain the outline data of the wafer W rotating at the minimum speed (the third outline data), and can determine whether the outline of the wafer W is normal or abnormal in a state in which the factor of the slip is excluded.

With respect to the above, the rotation speed of the wafer W not being the intermediate speed (step S176: NO) indicates that the rotation speed of the wafer W is the minimum speed at which the wafer W does not slip. Therefore, the determination processor 94 notifies the user that the outline position of the wafer W is abnormal through the user interface 86 (step S177). Accordingly, the user of the substrate processing system 1 can stably recognize the abnormality of the wafer W. After the notification of the error, the control device 80A may stop the operation of the substrate processing system 1 or the aligning apparatus 14 alone, or may perform the operation of taking out the wafer W having the error by the atmospheric transfer device 13. In this way, by performing the speed determination processing subroutine, the control device 80A can smoothly set a plurality of speeds (the initial speed, the intermediate speed, the minimum speed, the initial acceleration, the intermediate acceleration, and the minimum acceleration) to properly recognize whether the outline position of the wafer W is normal or abnormal.

Returning to FIG. 10, when the wafer W is normal and a correction amount is calculated by determining the eccentric amount of the wafer W, the next speed setting unit 98 determines whether the retry operation has not been performed in the alignment of the current wafer W (step S18). When the retry operation is not performed (step S18: YES), the next speed setting unit 98 determines to directly use the rotation speed of the current wafer W as the initial speed, and ends the current processing flow.

When the retry operation is performed (step S18: NO), it is determined whether the rotation speed of the wafer W during the retry operation is to be used in the alignment of the next wafer W (step S19). For example, when the wafer W is taken out from the same FOUP (step S19: YES), that is, when the wafer W is in the same lot, the next speed setting unit 98 sets the rotation speed during the retry operation. Accordingly, after the next wafer W is placed on the stage 141, the substrate processing system 1 can rotate the wafer W at the rotation speed during the retry and the slip of the wafer W can be reduced.

Conversely, in a situation in which the next wafer W is in a different lot or the like, it is determined that the rotation speed of the wafer W during the retry operation is not used (step S19: NO). Accordingly, the next speed setting unit 98 resets the rotation speed of the wafer W (step S20). As a result, the substrate processing system 1A can initially rotate the wafer W at the initial speed when the next wafer W is rotated.

As described above, also in the substrate processing system 1A and the substrate shape monitoring method according to the second embodiment, erroneous detection due to the slip of the wafer W can be avoided and the outline position of the wafer W can be accurately monitored, as in the first embodiment. In particular, by setting the intermediate speed, the intermediate acceleration, or both, the substrate processing system 1A can perform the retry operation without significantly lowering the speed at the time of the alignment, and can reduce a decrease in processing efficiency of the entire system.

The substrate processing system 1 is not limited to installing the aligning apparatus 14 in the front module FM, and may perform the alignment of the wafer W at another location in the substrate processing system 1. For example, as illustrated by a dotted line in FIG. 1, the substrate processing system 1 may provide an aligning apparatus 14A inside the transfer module TM. In the transfer module TM, the wafer W tends to slip easily because the pressure inside of the transfer container 31 is reduced to the vacuum atmosphere. Therefore, by appropriately changing the rotation speed in the alignment of the wafer W, the aligning apparatus 14A can reduce the slip of the wafer W.

Alternatively, in the substrate processing system 1, the stage 24 of the load-lock module LLM may have a function of aligning the wafer W, thereby detecting the outline position of the wafer W at the load-lock module LLM. In this case as well, by appropriately changing the rotation speed in the alignment of the wafer W, the slip of the wafer W can be reduced.

When the wafer W is initially rotated after the wafer W is placed on the stage 141, if the wafer W does not slip one or more times, the control device 80 may perform control to raise the rotation speed, the acceleration, or both of the wafer W to be detected next. Accordingly, the substrate processing system 1 and the substrate shape monitoring method can further improve the processing efficiency. For example, after performing the retry operation at the minimum speed, the control device 80 can gradually increase the rotation speed without continually setting the rotation speed to the minimum speed in the current and subsequent detection of the outline position of the wafer W, thereby promoting the processing efficiency while reducing the slip. For example, when the wafer W does not slip at the current initial speed, as a matter of course, the control device 80 may change the rotation speed of the next initial speed to a rotation speed higher than the current initial speed, the acceleration, or both. If the wafer W slips due to the increase in the speed, the control device 80 may perform a process of lowering the rotation speed to a rotation speed used in one previous stage in the detection of the outline position of the next wafer W.

In short, the control device 80 may search for an optimum value at which the wafer W is rotated quickly while reducing the occurrence of slip, as the rotation speed, the acceleration, or both when the wafer W is initially rotated after being placed on the stage 141. For example, the optimum value of the rotation speed, the acceleration, or both may be adjusted to an appropriate value by lowering the rotation speed or the acceleration by a predetermined speed unit when the slip occurs, and increasing the rotation speed or the acceleration by a predetermined speed unit when the slip does not occur. Alternatively, the control device 80 may calculate the optimum value of the rotation speed, the acceleration, or both by learning a tendency of the rotation speed, the acceleration, or both at which the wafer W slips, based on a plurality of rotation speeds, accelerations, or both at which the slip has occurred in the past.

The control device 80 may store information on a type of the wafer W detected in the past in association with information on the rotation speed, the acceleration, or both at the time of detection. When the outline position of the wafer W is initially detected, the control device 80 may search for the type of the wafer W, and if the same wafer W is found in the information on the type of the wafer W, the control device 80 may set the rotation speed, the acceleration, or both at which the wafer W has not slipped in the past. Accordingly, an appropriate rotation speed, acceleration, or both can be quickly set for the same type of wafer W, and the processing efficiency can be further promoted. For example, the control device 80 can easily obtain the information on the type of the wafer W and store the information in the memory by identifying an identification number or the like for each lot (FOUP). Alternatively, identification information may be embedded in the wafer W itself, and the control device 80 may read the identification information during transfer of the wafer W.

When the wafer W slips a plurality of times at the rotation speed at which the wafer W has not slipped in the past (for example, the minimum speed), the control device 80 may estimate deterioration of the holding member 145 and prompt the user to perform maintenance.

A technical idea and an effect of the present disclosure described in the above embodiments will be described below.

In a first aspect according to the present disclosure, the substrate processing systems 1 and 1A for processing the substrate (the wafer W) include: the stage 141 on which the substrate is to be placed; the rotation mechanism unit 143 that rotates the stage 141; the sensor 146 that detects the outline of the substrate during the rotation of the substrate; and the control devices 80 and 80A. The control devices 80 and 80A perform control of: (a) rotating the stage at the first speed and the first acceleration when the substrate is initially rotated; (b) when the stage is rotated by one full rotation from the rotation start point to the rotation end point, determining whether the misalignment amount of the outline position of the substrate between the rotation start point Rs and the rotation end point Re is greater than or equal to the threshold value (the shape determination threshold value) with reference to the information on the outline position of the substrate detected by the sensor; and (c) rotating the stage 141 at the second speed lower than the first speed, the second acceleration lower than the first acceleration, or both, and performing the retry operation of the determination of (b) in response to determining that the misalignment amount of the outline position of the substrate is greater than or equal to the threshold value.

According to the above, the substrate processing systems 1 and 1A may detect the outline position of the substrate by rotating the substrate at the second speed, the second acceleration, or both in a case in which the substrate slips and the rotation start point Rs and the rotation end point Re are misaligned by the threshold value (the shape determination threshold value) or greater when the substrate (the wafer W) is rotated at the first speed and the first acceleration. Therefore, because the outline position of the substrate is detected by rotating the substrate in the state in which the slip of the substrate is reduced, erroneous detection of the outline position of the substrate can be reduced. As a result, the substrate processing systems 1 and 1A can reduce the decrease of the production yield due to the error of the outline position of the substrate.

The second speed, the second acceleration, or both are set gradually lower in (c) when it is determined by the retry operation that the misalignment amount of the outline position of the substrate (the wafer W) is greater than or equal to the threshold value (the shape determination threshold value). The control devices 80 and 80A repeat (c) and the retry operation of (b) until it is determined that the misalignment amount of the outline position of the substrate is less than the threshold value, or until the second speed becomes a preset minimum speed and the second acceleration becomes a preset minimum acceleration. Accordingly, the substrate processing system 1 can detect the outline position of the substrate by lowering the rotation speed to a speed at which the substrate does not slip, thereby improving a detection accuracy.

The control devices 80 and 80A determine that the outline of the substrate (the wafer W) is abnormal and notify the error information when it is determined that the misalignment amount of the outline position of the substrate is greater than or equal to the threshold value (the shape determination threshold value) as a result of repeating (c) and the retry operation of (b) until the second speed becomes the minimum speed and the second acceleration becomes the preset minimum acceleration. Accordingly, the substrate processing systems 1 and 1A can allow the user to smoothly recognize the abnormality of the outline of the substrate when the rotation start point Rs and the rotation end point Re are misaligned even though the factor of the slip of the substrate is excluded.

The control devices 80 and 80A determine the slip during the rotation of the substrate when it is determined that the misalignment amount of the substrate (the wafer W) between the rotation start point Rs and the rotation end point Re is less than the threshold value (the shape determination threshold value) as a result of repeating (c) and the retry operation of (b). Accordingly, the substrate processing systems 1 and 1A can recognize the occurrence of the slip of the substrate, and can adjust the rotation speed (the first speed or the like) of the substrate to the optimum value at which no slip occurs, by accumulating data of the slip, for example.

The value of the second speed, the value of the second acceleration, or both that are set gradually lower can be set by the user. Accordingly, the substrate processing system 1A can allow the user to freely set the rotation speed of the substrate (the wafer W) to an appropriate speed.

The control devices 80 and 80A perform: (d) calculating the eccentric amount of the substrate (the wafer W) when it is determined in (b) that the misalignment amount of the outline position of the substrate is less than the threshold value (the shape determination threshold value). Accordingly, the substrate processing systems 1 and 1A may accurately set the correction amount of the movement of the atmospheric transfer device 13 with respect to the substrate based on the eccentric amount of the substrate, and can precisely align the atmospheric transfer device 13 and the substrate.

The control devices 80 and 80A perform control such that the detection of the outline position of the substrate (the wafer W) is repeatedly performed on the plurality of substrates, and sets the initial speed predetermined as the first speed and the initial acceleration predetermined as the first acceleration and initially rotates the stage 141 at the first speed and the first acceleration when the detection of the outline position of each of the plurality of substrates is performed in (a). In this way, the substrate processing systems 1 and 1A can maintain the processing efficiency by rotating each of the plurality of substrates at the first speed, and may slow the rotation speed only when the abnormality occurs on the outline position of the substrate.

The control device 80 performs control such that the detection of the outline position of the substrate (the wafer W) is repeatedly performed on the plurality of substrates. In a case in which it is determined that the misalignment amount of the outline position of the substrate is less than the threshold value (the shape determination threshold value) as a result of performing the retry operation on any previous one of the plurality of substrates while setting the second speed, the second acceleration, or both, when detection of the outline position of current and subsequent substrates is to be performed, the control device 80 sets the second speed or the third speed higher than the second speed as the first speed, sets the second acceleration or the third acceleration higher than the second acceleration as the first acceleration, or both, and rotates the stage 141 at the first speed in (a). Accordingly, the substrate processing systems 1 and 1A can prevent the substrate from slipping in advance by rotating the substrate at a rotation speed slower from the start when detecting the outline position of the next substrate.

In a case in which the storage unit (the memory 82) stores a type of the substrate (the wafer W) and a rotation speed when it is determined that the misalignment amount of the substrate is less than the threshold value (the shape determination threshold value), a type of a current substrate whose outline position is to be detected is acquired, and a substrate of the same type exists in the past, the control device 80 sets the rotation speed of the substrate of the same type in the past (the rotation speed of the substrate stored in the storage unit) when the current substrate is initially rotated after the current substrate is placed on the stage 141. Accordingly, when the types of the substrates are the same, the rotation speed of the current substrate can be easily matched with the past rotation speed of the substrate. Examples of the type of the substrate include a product wafer and a dummy wafer. The control device 80 can be identified when the substrate is loaded based on identification information provided in the substrate itself.

In a second aspect of the present disclosure, the aligning apparatus 14 for aligning the position of the substrate based on information on the outline position of the substrate (the wafer W) includes the stage 141 on which the substrate is to be placed, the rotation mechanism unit 143 that rotates the stage 141, and the sensor 146 that detects the outline of the substrate during rotation of the substrate. The sensor 146 detects the outline position of the substrate while the rotation mechanism unit 143 rotates the stage 141 by one full rotation from the rotation start point Rs to the rotation end point Re at the first speed and the first acceleration. In response to determining that the rotation start point Rs and the rotation end point Re in the information on the outline position of the substrate detected by the sensor 146 are misaligned by the threshold value or greater, the retry operation, in which the sensor 146 detects the outline position of the substrate while the rotation mechanism unit 143 rotates the stage by one full rotation from the rotation start point Rs to the rotation end point Re at the second speed lower than the first speed, the second acceleration lower than the first acceleration, or both, is performed.

A substrate shape monitoring method according to a third aspect of the present disclosure includes: (a) rotating the stage 141, on which the substrate (the wafer W) is placed, at the first speed and the first acceleration when initially detecting the outline position of the substrate; (b) after the stage 141 is rotated by one full rotation from the rotation start point Rs to the rotation end point Re, determining whether the misalignment amount of the outline position of the substrate between the rotation start point Rs and the rotation end point Re is greater than or equal to the threshold value (the shape determination threshold value) with reference to the information on the outline position of the substrate detected by the sensor 146; and (c) rotating the stage 141 at the second speed lower than the first speed, the second acceleration lower than the first acceleration, or both, and performing the retry operation of the determination of (b) in response to determining that the misalignment amount of the outline position of the substrate is greater than or equal to the threshold value.

According to the second aspect and the third aspect described above as well, when the outline position of the substrate (the wafer W) is detected by rotating the substrate, erroneous detection of the outline of the substrate can be reduced.

The substrate processing systems 1 and 1A, the aligning apparatus 14, and the substrate shape monitoring method according to the embodiments currently disclosed are illustrative in all aspects and are not limited. Various modifications and improvements can be made to the embodiments without departing from the spirit and scope of the appended claims. With respect to the matters described in the above multiple embodiments, other configurations can be adopted to the extent that they are not inconsistent and can be combined to the extent that they are not inconsistent.

According to one aspect, when an outline position of a substrate is detected by rotating the substrate, erroneous detection of an outline of the substrate can be reduced.

What is claimed is:

1. A substrate processing system for processing a substrate, the substrate processing system comprising:

a stage on which the substrate is to be placed;

a rotation mechanism unit configured to rotate the stage;

a sensor configured to detect an outline position of the substrate while the substrate is rotated; and a control device, wherein the control device performs control of:

(a) rotating the stage at a first speed and a first acceleration when the substrate is initially rotated;

(b) with reference to information on the outline position of the substrate detected by the sensor when the stage is rotated by one full rotation from a rotation start point to a rotation end point, determining whether a misalignment amount of the outline position of the substrate between the rotation start point and the rotation end point is greater than or equal to a threshold value; and (c) rotating the stage at a second speed lower than the first speed, a second acceleration lower than the first acceleration, or both, and performing a retry operation of the determination of (b) in response to determining that the misalignment amount of the outline position of the substrate is greater than or equal to the threshold value, the control device sequentially performs (a), (b) and (c), and (c) includes determining whether the first speed is an initial speed in response to determining that the misalignment amount of the outline position of the substrate is greater than or equal to the threshold value, and performing the retry operation of the determination of (b) while the stage is rotated at the second speed in response to determining that the first speed is the initial speed.

2. The substrate processing system according to claim 1, wherein the second speed, the second acceleration, or both are set gradually lower in (c) in response to determining that the misalignment amount of the outline position of the substrate is greater than or equal to the threshold value in the retry operation, and the control device repeats (c) and the retry operation of (b) until it is determined that the misalignment amount of the outline position of the substrate is less than the threshold value, or until the second speed becomes a preset minimum speed and the second acceleration becomes a preset minimum acceleration.

3. The substrate processing system according to claim 2, wherein the control device determines that the outline of the substrate is abnormal and notifies error information in response to determining that the misalignment amount of the outline position of the substrate is greater than or equal to the threshold value as a result of repeating (c) and the retry operation of (b) until the second speed becomes the preset minimum speed and the second acceleration becomes the preset minimum acceleration.

4. The substrate processing system according to claim 2, wherein the control device determines slip while the substrate is rotated in response to determining the misalignment amount of the outline position of the substrate is less than the threshold value as a result of repeating (c) and the retry operation of (b).

5. The substrate processing system according to claim 2, wherein a value of the second speed, a value of the second acceleration, or both that are set gradually lower are set by a user.

6. The substrate processing system according to claim 1, wherein the control device performs:

(d) calculating an eccentric amount of the substrate in response to determining in (b) that the misalignment amount of the outline position of the substrate is less than the threshold value.

7. The substrate processing system according to claim 1, wherein the control device performs control such that the outline position of the substrate is repeatedly detected with respect to a plurality of said substrates, and sets an initial speed predetermined as the first speed and an initial acceleration predetermined as the first acceleration and initially rotates the stage at the first speed and the first acceleration when the outline position of each of the plurality of substrates is detected in (a).

8. The substrate processing system according to claim 1, wherein the control device performs control such that the outline position of the substrate is repeatedly detected with respect to a plurality of said substrates, and in response to determining that the misalignment amount of the outline position of the substrate is less than the threshold value as a result of performing the retry operation on any previous one of the plurality of substrates while setting the second speed, the second acceleration, or both, sets the second speed or a third speed higher than the second speed as the first speed, the second acceleration or a third acceleration higher than the second acceleration as the first acceleration, or sets the second speed or the third speed as the first speed and the second acceleration or the third acceleration as the first acceleration, and rotates the stage at the first speed, the first acceleration, or both in (a) when detection of outline positions of current and subsequent substrates is to be performed.

9. The substrate processing system according to claim 1, wherein the control device stores, in a storage unit, a type of the substrate and a rotation speed of the substrate when it is determined that the misalignment amount of the substrate is less than the threshold value, acquires a type of a current substrate whose outline position is to be detected, and in response to determining that the type of the substrate stored in the storage unit is a same as the type of the current substrate, sets the rotation speed of the substrate stored in the storage unit when the current substrate is initially rotated after the current substrate is placed on the stage.

10. An aligning apparatus for aligning a position of a substrate based on information on an outline position of the substrate, the aligning apparatus comprising:

a stage on which the substrate is to be placed;

a rotation mechanism unit configured to rotate the stage; and a sensor configured to detect the outline position of the substrate while the substrate is rotated, wherein the sensor detects the outline position of the substrate while the rotation mechanism unit rotates the stage by one full rotation from a rotation start point to a rotation end point at a first speed and a first acceleration, a retry operation, in which the sensor detects the outline position of the substrate while the rotation mechanism unit rotates the stage by one full rotation from the rotation start point to the rotation end point at a second speed lower than the first speed, a second acceleration lower than the first acceleration, or both, is performed in response to determining that the rotation start point and the rotation end point in the information on the outline position of the substrate detected by the sensor are misaligned by a threshold value or greater, the outline position of the substrate being detected while the stage is rotated at the first speed and the first acceleration, and the retry operation is performed in response to determining that the first speed is an initial speed and the rotation start point and the rotation end point in the information on the outline position of the substrate detected by the sensor are misaligned by the threshold value or greater.

11. A substrate shape monitoring method, comprising:

(a) rotating a stage on which a substrate is placed at a first speed and a first acceleration when initially detecting an outline position of the substrate;

(b) with reference to information on the outline position of the substrate detected by a sensor when the stage is rotated by one full rotation from a rotation start point to a rotation end point, determining whether a misalignment amount of the outline position of the substrate between the rotation start point and the rotation end point is greater than or equal to a threshold value; and (c) rotating the stage at a second speed lower than the first speed, a second acceleration lower than the first acceleration, or both, and performing a retry operation of the determination of (b) in response to determining that the misalignment amount of the outline position of the substrate is greater than or equal to the threshold value, wherein (a), (b), and (c) are sequentially performed, and wherein (c) includes determining whether the first speed is an initial speed in response to determining that the misalignment amount of the outline position of the substrate is greater than or equal to the threshold value, and performing the retry operation of the determination of (b) while the stage is rotated at the second speed in response to determining that the first speed is the initial speed.

12. The substrate processing system according to claim 1, wherein the second speed is a minimum speed at which the substrate does not slip with respect to the stage, and (c) includes determining whether the first speed is the minimum speed in response to determining that the misalignment amount of the outline position of the substrate is greater than or equal to the threshold value, and performing the retry operation of the determination of (b) while the stage is rotated at the second speed in response to determining that the first speed is not the minimum speed.

* * * * *